United States Patent [19]

Jacks

[11] 4,044,628
[45] Aug. 30, 1977

[54] TORSIONAL DAMPER

[75] Inventor: Roy T. Jacks, Sterling Heights, Mich.

[73] Assignee: U.S. Manufacturing Corporation, Fraser, Mich.

[21] Appl. No.: 670,052

[22] Filed: Mar. 24, 1976

[51] Int. Cl.² ............................................. F16F 15/10
[52] U.S. Cl. ....................................... 74/574; 74/604; 74/573 R; 64/1 V
[58] Field of Search ............ 74/604, 573, 574, 573 F; 192/21.5, 70.17, 30 V; 188/1 B, 218 A, 73.5; 64/1 V

[56] References Cited

U.S. PATENT DOCUMENTS

| | | | |
|---|---|---|---|
| 3,136,178 | 6/1964 | O'Connor | 74/574 |
| 3,221,849 | 12/1965 | Klass et al. | 192/21.5 |
| 3,387,505 | 6/1968 | Rumsey | 74/574 |
| 3,462,136 | 8/1969 | Rumsey | 188/1 B |

FOREIGN PATENT DOCUMENTS 153,952  9/1903  Germany ................. 74/574

Primary Examiner—Samuel Scott
Assistant Examiner—Don E. Ferrell
Attorney, Agent, or Firm—Cullen, Settle, Sloman & Cantor

[57] ABSTRACT

A torsional damper for reducing the vibrations produced when a shaft is driven by the intermittent application of a discontinuous force thereto, e.g. the crankshaft of an internal combustion engine, comprising an integrally formed disk-like mass having three concentric zones, namely, an inner central zone, an outer annular zone, and an intermediate spring zone therebetween. The spring zone includes narrow, elongated, spirally-arranged, overlapping slots extending axially through the disk and radially between the inner and outer zones to provide spirally-arranged overlapping web portions which act as torsional springs or shock absorbers due to an inherent resiliency. The spirally slotted damper is formed as an integral unit by casting it from a metal such as cast iron with the spiraled slots having a predetermined size and shape to provide the desired damping effect.

9 Claims, 6 Drawing Figures

TORSIONAL DAMPER

BACKGROUND OF THE INVENTION

The invention relates to a torsional vibration damper for damping out vibrations and rotational fluctuations in a shaft which is driven by the intermittent application of a discontinuous force, such as the crankshaft of an internal combustion engine.

The vibrational problems inherent in internal combustion engines and in other applications wherein a shaft is driveably rotated by the intermittent application of a discontinuous torque-like force have been recognized for some time. Vibrational dampers and torsional balancers have been designed to control vibrations and prevent the oscilations from building up to the point that the engine or other parts of the vehicle may be damaged or to the point where the operator feels uncomfortable.

The vibrational dampers previously used where generally crude, expensive to make, and different to repair. Such dampers usually employed many parts and were extremely difficult to assemble. Some used shock-absorbing inserts which had to be individually installed at a plurality of locations on a fly wheel-type mass. Others utilized concentric layers of shock-absorbing materials such as rubber or the like sandwiched between annular concentric layers of metal. These dampers proved to be very difficult to make and have proved too expensive to attain widespread acceptance in the industry.

This invention presents a method and apparatus for solving the torsional vibration problem in a relatively inexpensive manner. A spiral slotted disk is formed as an integral unit by metal casting techniques and the disk in then attached to the shaft to dampen out the vibrations.

SUMMARY OF THE INVENTION

This invention teaches a portional damper for reducing the vibrations produced when a shaft is driven by the intermittent application of a discontinuous force such as a crankshaft driven by an internal combustion engine. The torsional vibration damper of this invention includes a unitary, integrally-formed, disk-like mass having three concentric zones, namely, an inner central zone, an outer annular zone, and an intermediate spring zone therebetween. The spring zone includes elongated, spirally-arranged, overlapping slots extending axially through the disk and radially between the inner and outer zones to provide spirally-arranged, overlapping web portions which act as torsional springs or shock absorbers due to an inherent resiliency. The spirally slotted damper is formed as an integral unit by metal casting it with spiraled slots whose size and shape may be predetermined to provide the desired damping effect.

The vibrational damping method of the present invention contemplates that, after the requirements of the particular application have been studied and suitable dimensions for the spirally slotted disk-like mass have been selected, the steps of designing a pattern having the required dimensions; casting a unitary, integral, spirally slotted disk in the desired pattern from a suitable casting metal such as cast iron; and then mounting the integrally cast disk onto the shaft to dampen out torsional vibrations.

The present invention also contemplates the method of forming a torsional vibration damper which includes the steps of preparing a pattern designed to form a disk having radially spiraled slots therein; making a mold from the designed pattern; and casting a ferrous material such as cast iron, malleable iron, cast steel, Armco iron, carbon steel, or SAE 6150 heat-treated steel in said mold to form a one-piece, integrally-cast, disk having spirally-arranged slots extending axially therethrough. The cast disk may be formed with a central bore which may subsequently be machined, but the slotted portions of the disk do not require machining, thereby greatly reducing the cost of making the torsional damper of the present invention.

The fact that the torsional vibration damper of this invention can be cast as a single integral piece renders it much easier to make, less expensive, and easier to maintain than any of those previously used. The ability to utilize the castable materials mentioned above, which are not normally noted for use as a spring material is a surprising aspect of this invention.

The torsional vibration damper of the present invention provides an efficient means whereby torsional vibrations can be reduced or eliminated to prevent damage to the vehicle, the engine, or any parts thereof. All of these advantages are accomplished at a minimum of cost which is only a fraction of the cost currently involved in producing torsional dampers. The method of making the torsional damper of the present invention and its relatively simple design combine to achieve this significant cost reduction at an increase in dampening efficiency. The resulting damper is not only inexpensive to make in terms of the cost of materials involved but also in terms of the amount of labor required to construct or assemble the damper. Additional savings result from the fact that this torsional damper requires virtually no repair or maintenance costs during the life of the engine or vehicle.

Other advantages and meritorious features of this invention will be more fully understood from the following detailed description of the drawings and the preferred embodiment, the appended claims and the drawings which are briefly described below.

DESCRIPTION OF THE PREFERRED EMBODIMENT

Figure 1:
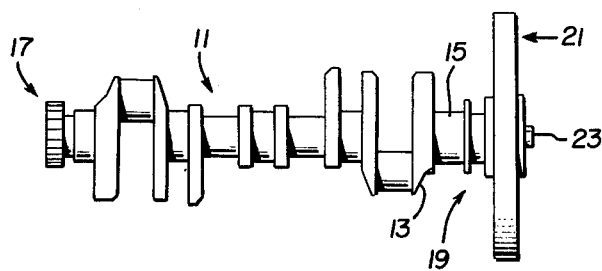
FIG. 1 is a schematic illustration of the crankshaft of an internal combustion engine having the torsional vibration damper of the present invention mounted thereon.

FIG. 1 illustrates a crankshaft 11 of an internal combustion engine which is not shown but which is conventionally known. The crankshaft 11 includes a crank portion 13 and a shaft portion 15. The crankshaft 11 also has a rear portion or fly wheel end 17 and a front end portion 19. The torsional vibration damper 21 of the present invention is securely mounted to the shaft 15 at the front end portion 19 by any type of suitable, conventionally known fastening means 23.

The crankshaft 11 must be strong enough to taken the downward thrust of the pistons during the power strokes without excessive distortion. The power impulses from the pistons tend to set up torsional vibrations in the crankshaft 11. When a piston moves down on its power stroke, it thrusts through the connecting rod against a king pin with a force that may exceed two tons. This force tends to twist the crank 13 ahead of the rest of the crankshaft 11, and then, immediately thereafter, the force against the crank 13 is relieved causing the crank to untwist or move back to its original relationship with the rest of the crankshaft 11.

This twisting-untwisting which is repeated with every power impulse, tends to set up an oscillating motion in the crankshaft 11. This is generally referred to as torsional vibration and, if it is not controlled, it can cause the oscillations to build up to such an extent that the crankshaft 11 may break at certain speeds. Even if such a build up does not occur, the vibrations produced cause a rough running engine, discomfort to the operator, and may severely damage the engine or other parts of the vehicle.

The torsional vibration damper 21 of the present invention acts as a damper or shock-absorber to minimize the vibrational effects and prevent these oscilations from building up. The damper 21 imposes a dragging effect upon the crankshaft 11 as it tends to speed up and operates to hold it at a constant speed when it would normally tend to slow down thereby eliminating the fluctuations in the rotational velocity of the crakshaft 11 and preventing or minimizing the effects of torsional vibration.

Figure 4:
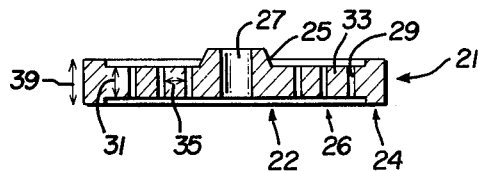
FIG. 4 is a cross-sectional view of the spirally slotted disk of the present invention taken along lines 4—4 of FIG. 5.
Figure 3:
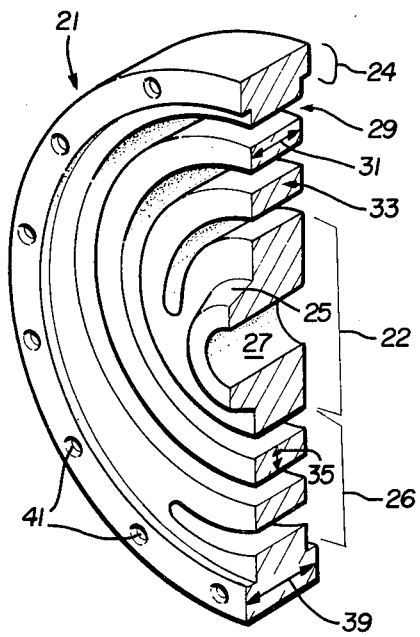
FIG. 3 is a fragmentary perspective view of a portion of the spirally slotted, disk-like mass or torsional vibration damper of the present invention.

The torsional vibration damper 21 of the present invention will now be described with reference to FIGS. 3, 4 and 5. The torsional damper 21 comprises an integrally formed disk-like mass or disk having three concentric zones, namely, an inner central zone 22, an outer annular zone 24, and an intermediate spring zone 26 formed between the inner zone 22 and the outer zone 24.

The inner central zone 22 may include a hub portion 25 having a central bore 27 which is adapted to receive the shaft 15 and to be rigidly secured to the shaft 15 for rotation therewith.

The intermediate or spring zone 26 includes a plurality of narrow, elongated, spirally-arranged, overlapping slots 29 which pass completely through the axial depth of the intermediate portion 26 of the disk 21 as indicated by the reference numeral 31. Disposed adjacent to the spiral slots 29 and defined thereby are a plurality of spirally-arranged, overlapping web portions 33 whose radial cross-sectional thickness is measured as indicated by the reference numeral 35. The inherent resiliency of these web portions 33 enable them to act as torsional springs or shock-absorbers so that they are able to bend, deflect, or yield in a first radial direction into an adjacent slot 29 to absorb the energy imparted to the shaft 15 during the application of said discontinuous torque-like force for storing the absorbed energy as potential energy which is a function of the spring constant and displacement of the web portion 33 thereby lessening the tendency of the shaft 15 to increase its rotational velocity in response to said force application. The web portion 33 is able to unbend due to its inherent resiliency and return to its original radial position to release the energy stored therein and convert it to kinetic energy after the termination of application of said discontinuous torque-like force thereby lessening the tendency of the shaft 15 to decrease its rotational velocity in response to the termination of the force application so as to dampen out rotational fluctuations and produce a more uniform shaft rotation.

Figure 5:
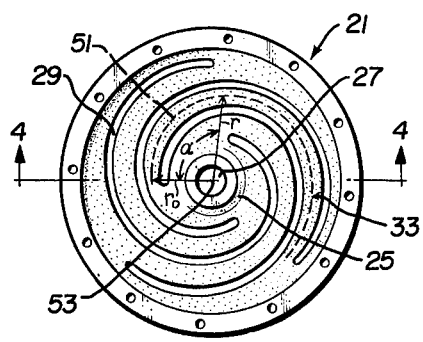
FIG. 5 is a top view of the spirally slotted disk or torsional vibration damper of the present invention illustrating the orientation and extent of the spiral slots and webs.

FIG. 5 shows a top view of the torsional vibration damper 21 of the present invention wherein the spiral pattern of the slots 29 and the web portions 33 is clearly shown. The apertures 41 may represent holes bored in the outer annular portion 24 to change the mass of the disk 21 for obtaining a predetermined desired polar moment of inertia or for balancing the disk 21. In the alternative, the holes 41 could be used to fasten the damper 21 onto the radiator fan mounting or the like. In yet another alternative, the apertures 41 could be eliminated altogether without effecting the concept of the present invention.

Figure 2:
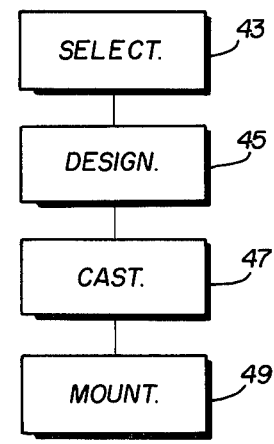
FIG. 2 is a block diagram illustrating the steps involved in carrying out the method of damping out torsional vibrations of the present invention.

The method of damping out rotational vibrations contemplated by the present invention is represented generally by the blocks 43, 45, 47 and 49 of FIG. 2. While the overall method of vibrational dampening of the present invention will be discussed with reference to a particular example, it is in no way to be limited thereby, and it will be appreciated that the principles applied in the specific example will work equally as well in any other application requiring the dampening of torsional vibrations.

Assume initially that the vibrational damper 21 of the present invention is to be designed to meet a particular part specification established by one of the major auto manufacturers. Assume that the specification requires that the damper assembly 21 must tune to frequency of 165/180 CPS at 150° F; that the polar moment of inertia of the damper mass is required to be 0.12 in.lb.sec.$^2$; and that the maximum outside radius R of the disk 21 is chosen to be some value such as 3.375 inches due to the space limitations of the environment in which the particular damper assembly 21 is to be used in this application.

Since the undeflected spiral web centerlines, illustrated by the reference numeral 51 in FIG. 5, are given by the generalized equation $r = r_o + aC$, where $r$ is the radial distance from the spiral center 53 to any point on the web centerline 51, where $r_o$ is the initial radial line and where $a$ is the angle between the initial radial line $r_o$ and the general radial line $r$. In the particular example set forth herein, a value of $1.5/2\pi$ has been selected for the constant C to provide for a radial distance increase of 1.5 inches for each 360° of arc or 0.5 inches between each of the three web centerlines represented by the dotted lines 51. A value of 1.5 inches has been selected for $r_o$ which provides for an initial radial distance of 1.5 inches from the radial center 53 to the radially innermost starting point of each of the three web portions 33.

In the specific example set forth herein, the web cross-sectional depth, as indicated at reference numeral 31, was limited to 1.125 inches and the web cross-sectional radial thickness, as indicated by the reference numeral 35, was limited to 0.375 inches in order to allow for a 0.125 inch minimum clearance radially across the slots 29 between the adjacent constant thickness webs 33. These dimensions are merely matters of choice and may be selected arbitrarily depending upon the space limitations of the environment in which the damper 21 is to be used so long as sufficient clearances are allowed between the webs 33.

All of the steps recited above are contemplated within the initial selecting step of block 43 of FIG. 2, and are not specifically considered as being within the scope of the method of the present invention. The design step of block 45, the casting step of block 47 and the mounting step of block 49 form the basis of the method of vibrational dampening within the scope of this invention. The design step of block 45 is relatively complicated since a pattern such as that indicated by the reference numeral 55 in FIG. 6 must be designed to form a mold in which the slotted disk 21 is cast to meet the needs of the particular application.

It is known that for a given amount of torque applied to the damper 21 by the crankshaft 11, its angular displacement can be calculated. Within the limits of the yield strength of the webs 33, the relationship between torque and displacement is generally linear. Therefore, a torsional spring constant K may be defined such that K equals the torque applied to the damper mass 21 by the crankshaft 11 divided by the angular displacement thereof. Similarly, for a rectangular web, as illustrated in the present example, the momement of inertia of the web may be calculated in accordance with the formula $I_{xx} = 1/12$ (web depth) (web thickness)$^3$. Therefore, for a given web cross-sectional geometry and a given web spiral angle, the torsional spring constant K may be determined.

It can also be shown that the polar moment of inertia J of the damper mass 21 times its angular acceleration equals the negative of its angular displacement times the torsional spring constant K. With this relationship it may be shown that the frequency of oscilation $f$ is expressed by the formula $f = \frac{1}{2}\pi\sqrt{K/J}$, where J is the polar moment of inertia of the damper mass 21 and K is the torsional spring constant. In the present example, a required frequency of 172.5 cycle per second was utilized since it represents the half-way point within the specified frequency range of 165 to 180 CPS. Also, the polar moment of inertia J of the damper mass or weight 21 was initially specified to be 0.12 in.lb.sec.$^2$. Therefore, the required value of K is 2460 in.lb./degree for the present example.

For a torsional spring constant of 2460 in.lb./degree, the required web size is a function of web spiral angle. Since we initially limited the web thickness to a maximum of 0.375 inches and assuming we are calculating only to the nearest 5° increment of web spiral angle, the optimum web spiral angle which meets both the frequency requirement and the physical space requirement can be no more than 215°. We also know that the maximum web stress is reduced as the spiral angle is increased. Therefore, the web spiral angle at which the stress is minimized becomes the maximum web spiral angle of 215°. At 215°, the moment of inertia Ixx is 0.00487 in.$^4$, the web thickness is 0.373 inches and the maximum stress due to bending is approximately 32,300 PSI.

Knowing the maximum tensile strength of the various castable metals utilizable with the present invention, (such as cast iron, malleable iron, cast steel, Armco iron, carbon steel or even SAE 6150 heat-treated steel) in the present example, cast iron was selected which has a tensile strength of approximately 50,000 PSI and a fatique limit of 24,000 PSI. This would appear to leave plenty of room for error and, as conventionally known, if the working level of the applied torque approaches the ultimate level, the part could be fabricated from a different castable metal, such as cast steel having a tensile strength of 60,000 to 80,000 PSI and a fatigue limit of 24,000 to 32,000 PSI.

Since it was initially required, in the present example, that the polar moment of inertia be 0.12 in.lb.sec.$^2$, the centerline and thickness of the 215° spiral web defines the inner contour of the outer annular ring portion 24. The outside radius R was initially selected as 3.375 inches and 12 apertures 41 having a 5/16 inch diameter are spaced 30° apart at a radial distance of 3 inches. These apertures, as previously explained, may be used for balancing purposes, for attaching the disk to some other apparatus, or as a means for varing the mass of the overall disk 21. Therefore, the only parameter which can still be varied to give the desired polar moment of inertia J is the depth $d$ of the outer annular portion 24. For the case in point, the depth $d$ of the outer annular ring 24 is 1.263 inches based upon the equation $$J = \frac{\pi \rho d R^4}{2} - \frac{3\rho d}{2\alpha C}\left[\left(r_o + C\alpha_c + \frac{2\pi C}{3} - \frac{W}{2}\right)^5 - \left(r_o + C\alpha_c - \frac{W}{2}\right)^5\right]$$

where $\alpha c = 215°$, where the web thickness W = 0.373 inches and where the material used is cast iron having a density $\rho$ of 0.268 lbs./in.$^3$.

Figure 6:
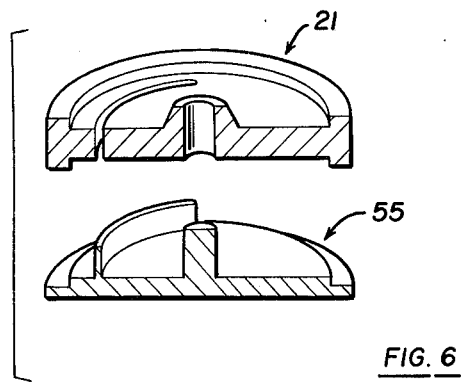
FIG. 6 is a fragmentary perspective view illustrating a pattern used to make a mold to cast the spirally slotted disk of this invention.

Once all of these design criteria are met, the pattern 55 as shown in FIG. 6 is made as represented by block 45 of FIG. 2, and, as conventionally known, the pattern may be used to make a mold cavity in which the metals previously recited can be cast as indicated by block 47 of FIG. 2 to form a one-piece, integrally-cast, spirally slotted disk-like mass 21, with the design pattern specifying the particular dimensions of the various portions of the disk 21 as indicated by block 29, the cast disk 21 is then mounted onto the crankshaft 11 for rotation therewith so as to dampen out rotational fluctuations and reduce or eliminate torsional vibrations.

The method of forming the torsional vibration damper previously described includes the steps of preparing a pattern designed to form a disk having radially spiralled slots therein; making a mold from the designed pattern; and then casting a ferrous material such as cast iron, malleable iron, cast steel, Armco iron, carbon steel, or heat-treated steel in said pattern to form a one-piece integrally-cast, disk having spirally-arranged slots extending axially therethrough. This method is generally illustrated by the casting pattern 55 of FIG. 6 and the actual casting steps are considered to be conventional and do not form a part of the present invention.

Additionally, it has been observed that the stress due to bending varies along the length of the elongated spiraled portions or webs 33 of the disk 21. The points of maximum and minimum stress may be determined and plotted, and the variation in stress levels along the arc of the web 33 may be compensated for by varying the thickness 35 of the web 33 along the arc in such a manner that the stress level will become constant. In this manner, additional casting material such as cast iron may be added to the more highly stressed areas and removed from the areas of lower stress by changing the dimensions of the molding cavity. Not only would the cost of the materials used be significantly reduced, but the maximum level of stress would be significantly diminished.

With this detailed description of the specific method and apparatus used to illustrate the prime embodiment of the present invention and the operation thereof, it will be obvious that various modifications can be made in the materials used, in the number of spiral slots or webs employed, in the length, width, and pitch of the spiral angle employed, and in the dimensions of the various portions of the damper 21 as well as to the various applications in which it is utilized without departing from the spirit and scope of the present invention which is limited only by the appended claims.

I claim:

1. A torsional damper for damping out vibrations produced when a shaft is driven by the intermittent application of a discontinuous torque-like force comprising a unitary, integrally cast, disk-like mass having three concentric portions, namely, a first central portion adapted for engaging said driven shaft, a second outer annular ring portion, and an intermediate spring-like portion coupling said inner and outer portions, said spring-like portion including elongated, spirally-arranged, overlapping slots of uniform radial thickness extending axially through said disk and radially between said inner and outer portions to provide spirally-arranged integral web portions adapted to act as torsional shock-absorbing spring means for damping out said vibrations, and wherein for each spiral slot, its radial distances from the spiral center to any point along the web portion centerline is given by the equation $r = r_o + \alpha C$.

2. The torsional damper of claim 1 further characterized in that said disk-like mass is a single, one-piece, integrally-cast piece of castable ferrous metal.

3. The torsional damper of claim 1 further characterized in that said at least three spiraled slots extend through a spiral angle of approximately 215°.

4. The torsional damper of claim 1 further characterized in that said outer annular ring portion is adapted to have its axial thickness varied during the forming process in order to obtain a predetermined specified polar moment of inertia for the overall damper.

5. The torsional damper of claim 1 further characterized in that the cross-sectional dimensions of said spirally-arranged web portions are constant along said radial spiral.

6. The torsional damper of claim 1 further characterized in that the cross-sectional dimensions of said spirally-arranged web portions may be varied to reinforce the more highly stressed areas so as to maintain the stress level constant over the length of the spiral web.

7. A torsional vibration damper apparatus for damping out rotational fluctuations produced when a crankshaft is driven by the discontinuous force applications of an internal combustion engine, said damper comprising a unitary, disk-like mass having a radially central portion adapted for engaging the crankshaft for rotation therewith, a concentric, radially outer annular portion, and an intermediate shock-absorbing portion connecting the inner portion to the outer portion, said intermediate portion including at least one spirally-arranged slot of uniform radial thickness extending axially through said intermediate portion and radially between said inner and outer portions, and wherein the centerline of the spiral web portion is defined by the equation $r = r_o + \alpha C$, where $r$ is the radial distance from the spiral center to any point on the web centerline, $r_o$ is the initial radial distance from the spiral center to the centerline of the web portion at its radially innermost starting point, C is a constant which may be arbitrarily selected to determine a given radial distance increase per 360° of arc and $\alpha$ is the angle between the initial radial line $r_o$ and the general radial line $r$, and a spirally-arranged web portion radially adjacent said spiral slot, said web portion being responsive to said discontinuous force application for yielding in a first radial direction to absorb the energy imparted to said shaft by said force application and store said energy as potential energy which is a function of the spring constant and displacement of said web portion thereby lessening the tendency of the rotational velocity of said shaft to increase during said force application and being responsive to the termination of said force application for returning in the opposite radial direction to its normal position for releasing the stored potential energy and converting it to kinetic energy thereby lessening the tendency of the rotational velocity of said shaft to decrease upon the termination of said force application so as to dampen out rotational fluctuations and produce a more uniform shaft rotation.

8. The torsional vibration damper of claim 7 further characterized in that said at least one spiral slot extends through a spiral angle of at least 180°.

9. The torsional vibration damper of claim 7 further characterized in that said intermediate portion includes a plurality of equally spaced, overlapping, spirally arranged slots, each of which is extends through a spiral angle of more than 180°.

* * * * *